No. 650,638. Patented May 29, 1900.
G. M. DIXON.
ELASTIC WHEEL HUB FOR VEHICLES.
(Application filed Feb. 3, 1900.)
(No Model.) 2 Sheets—Sheet 1.
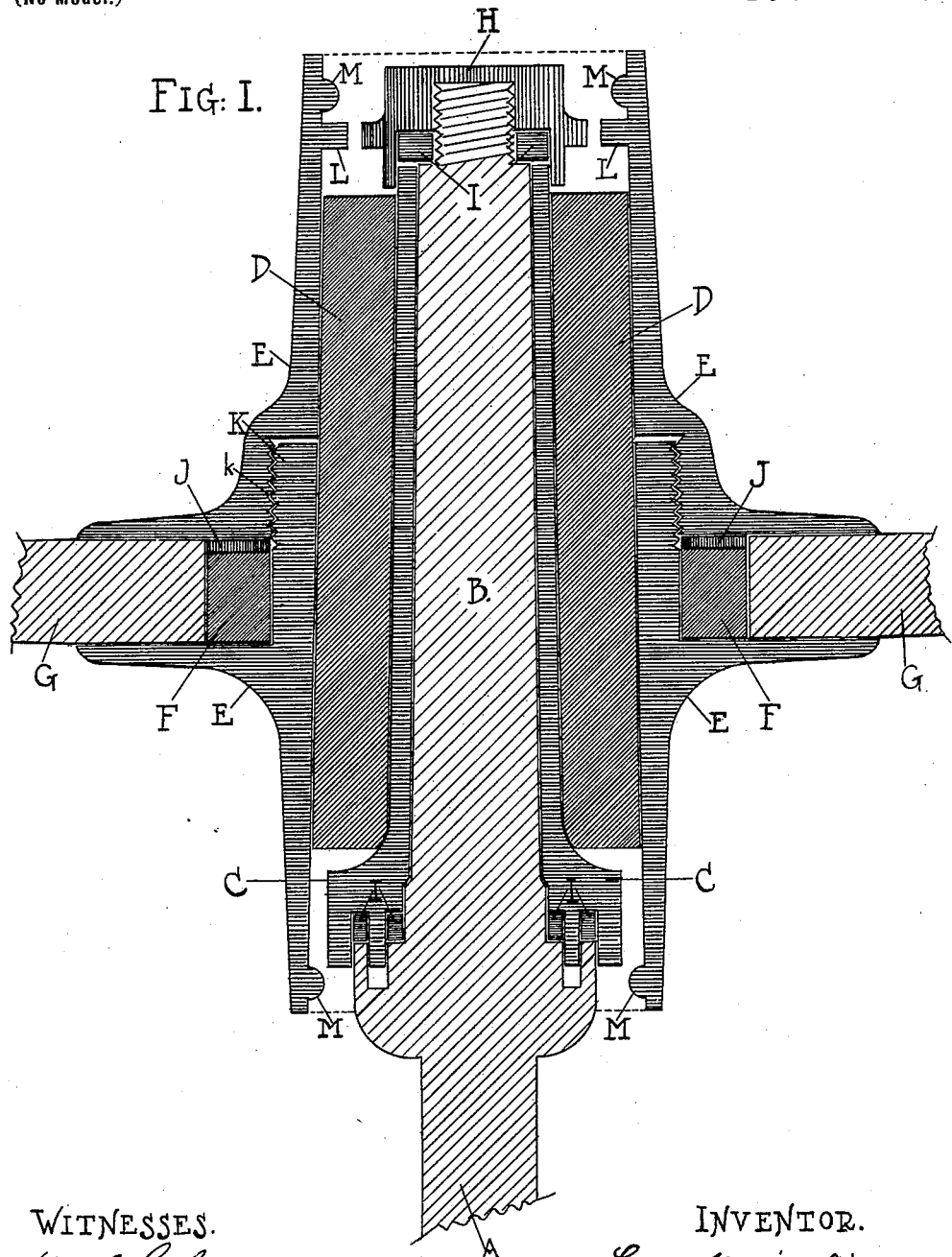
FIG. I.
WITNESSES.
F. H. Schardin
S. Solon Holl
INVENTOR.
George Merritt Dixon
THE NORRIS PETERS CO., PHOTO-LITHO., WASHINGTON, D. C.

No. 650,638. Patented May 29, 1900.
G. M. DIXON.
ELASTIC WHEEL HUB FOR VEHICLES.
(Application filed Feb. 3, 1900.)
(No Model.) 2 Sheets—Sheet 2.
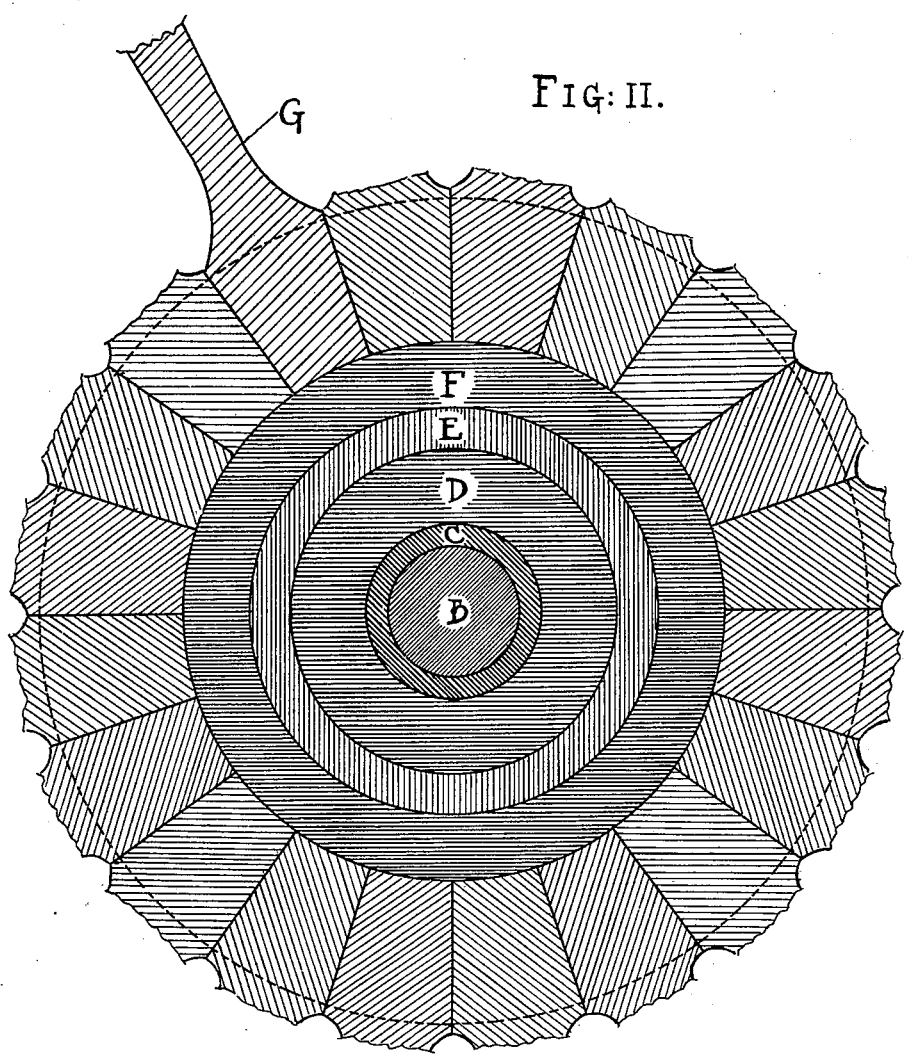
FIG: II.
WITNESSES
F. H. Schardin
S. Solon Holl
INVENTOR.
George Merritt Dixon

UNITED STATES PATENT OFFICE.

GEORGE MERRITT DIXON, OF SACRAMENTO, CALIFORNIA.

ELASTIC WHEEL-HUB FOR VEHICLES.

SPECIFICATION forming part of Letters Patent No. 650,638, dated May 29, 1900.

Application filed February 3, 1900. Serial No. 3,804. (No model.)

*To all whom it may concern:*

Be it known that I, GEORGE MERRITT DIXON, a citizen of the United States, residing in the city of Sacramento, county of Sacramento, State of California, have invented an Elastic Wheel-Hub for Vehicles, of which the following is a specification.

Figure 1 of the accompanying drawings is a representation of a vertical longitudinal central section of my hub. Fig. 2 is a cross-section of the same.

The objects of my invention are, first, to secure an elastic hub for wheels of vehicles in order to obviate jar, noise, and rigidity; second, to relieve the wheel from lateral strain by permitting a side motion when necessary of an inch, more or less, of periphery of wheel; third, to secure simplicity, facilitate construction, and increase the durability of wheel, and, fourth, to set and reset the tire of wheel without removing, cutting, or heating the same. These objects are attained in the following manner:

Referring to the accompanying drawings, it will be observed, first, that taking the "Richards" axle A and spindle B now on the market and in general use as a basis a rubber tube or auxiliary box D D, of any desired thickness, is placed between the iron box C C and a peculiarly-constructed hub-rim E E E E, space being allowed at each end for expansion and between metal box and hub-rim for compression, which rubber tube D D, acting in conjunction with the rubber band F F, hereinafter described, by the elasticity thus attained, neutralizes bound, jar, and jolt, and by slight compression at one end and corresponding expansion at the other end of rubber box D D the periphery of wheel is allowed to move laterally an inch or more, thus relieving the wheel from lateral strain. Any other style of axle and spindle can be used by merely making a slight change in the form of the metal hub-rim.

The hub-rim is made in two sections E E. The inner section has a horizontal flange K, upon which a thread is cut, the outer section being screwed thereon by means of a thread cut in its counter-flange *k*. Each section has a radial flange, and when sections are screwed together these flanges approach one another, compressing the rubber band F F, hereinafter described, and grasping firmly the inner ends of the spokes G G like a vise, rendering them immovable. A flange L L on the inner surface of the outer section of the hub-rim, near the outer end, and which extends to within one-eighth of an inch or more, if desired, of the rim of the nut H on spindle B is designed to limit the motion under compression of the rubber tube or auxiliary box above described. A corresponding inner flange L L might be placed on inner surface of inner section to approximate rim of shoulder of spindle when required; but this is unnecessary when the Richards axle is used, as in Fig. 1, as the bell-like expansion of the iron box or bearing sufficiently fills the space in the inner hub-section. Small metal projections or lugs M M M M are provided on each side of inner surface of hub-rim near each end to receive and hold the bit of a wrench used in screwing up the two sections of hub-rim. If desired, the ends of hub-rim may be finished in the form of a nut for the same purpose.

A solid rubber band F F is placed around the horizontal flange of the inner hub-rim under the ends of the spokes, any desired space between the ends of spokes and the horizontal flange being entirely filled by a corresponding thickness of rubber band, the rubber band being wider than the spokes to an extent sufficient that when pressed in by the approximation of radial flanges when hub is screwed up the rubber band will be expanded in its space, forcing the spokes and felly firmly against the tire, setting the same. Said rubber band when thus compressed and expanded receives and neutralizes direct bound and jolt, permitting but a small part of the same to reach the rubber tube or auxiliary box.

A metal washer J J, of any desired thickness, is designed to be used subsequently to reset the tire when necessary by unscrewing hub, placing washer against rubber band F F, and forcing spokes and felly firmly against tire by screwing up the hub.

The simplicity and facility are shown when the several parts of the wheel are in readiness by the manner of putting the wheel together. The inner section of the hub-rim is placed in a central depression on a small platform, and the rubber box D D, having first been put over the iron box C C, is pressed into position in the inner section. The rubber band F F is next placed around the horizontal flange of the inner hub-rim. The tire (cold) is laid in position, the felly fitted snugly into it, and the tenon ends of spokes into felly, their inner ends resting squarely upon the rubber band F F. The outer section of the hub-rim is then forced down upon the rubber box D D until the threads K k meet, when the sections are screwed together until the spokes are firmly and immovably held between the flanges of the hub-rim, the radial expansion of the rubber band F F forcing the spokes and felly against the tire, setting it firmly, the wheel being now complete, and the ordinary cost of setting tire and box avoided.

I claim as my invention and desire to secure by Letters Patent—

1. In wheels, the combination of the two-part metal hub-rim having screw connection and radial flanges, a rubber band and metal washer inclosed within the radial flanges, and spokes whose inner ends rest on said rubber band, whereby when the hub-rims are screwed together the rubber band will be compressed and the spokes forced outward, firmly against the rim of the wheel, as set forth.

2. In wheels, the combination of the sectional metal hub-rim E E having guide-flanges L L as described, iron spindle-box C C and rubber tube D D held between the hub-rim and spindle-box and adapted to expand in either direction, whereby alternate compression and expansion of either end of said tube may take place, thus preventing noise and jar by the movement of the wheel, all arranged as set forth.

3. In wheels, the combination of the sectional metal hub-rim E E having radial flanges, the rubber band F F and metal washer J inclosed by said flanges, the spindle-box C C located as shown and the rubber tube D D, all coöperatively arranged as set forth.

GEORGE MERRITT DIXON.

Witnesses:
  R. T. McKISICK,
  CLIFFORD TODD.